Figure 1:
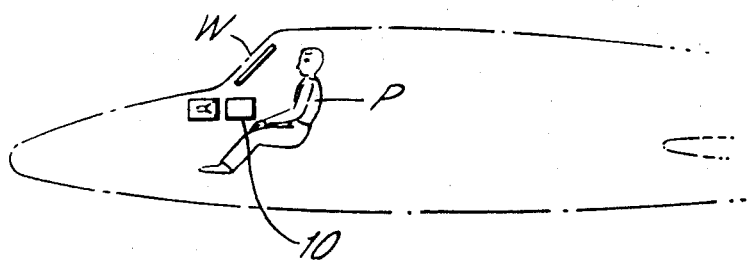

United States Patent [19]
Day

[11] 3,840,289
[45] Oct. 8, 1974

[54] OPTICAL DISPLAY APPARATUS
[75] Inventor: David John Day, Cheltenham, England
[73] Assignee: The Rank Organisation Limited, London, England
[22] Filed: Dec. 14, 1972
[21] Appl. No.: 314,936

[30] Foreign Application Priority Data
Dec. 14, 1971 Great Britain.................. 57967/71

[52] U.S. Cl.................. 350/174, 350/173, 350/202
[51] Int. Cl. .......................................... G02b 27/10
[58] Field of Search.................. 350/173, 174, 202; 356/251, 252

[56] References Cited
UNITED STATES PATENTS

| | | | |
|---|---|---|---|
| 2,537,996 | 1/1951 | Hankes | 350/174 X |
| 2,963,937 | 12/1960 | Raitiere | 350/173 |
| 3,526,447 | 9/1970 | Wynne | 350/174 |
| 3,532,413 | 10/1970 | Ellis et al. | 350/174 |
| 3,612,663 | 10/1971 | Tronnier et al. | 350/173 X |
| 3,666,887 | 5/1972 | Freeman | 350/174 |
| 3,679,297 | 7/1972 | Searle et al. | 350/174 X |

*Primary Examiner*—David H. Rubin
*Attorney, Agent, or Firm*—Brisebois & Kruger

[57] ABSTRACT

A head-up optical display unit comprising a beam-splitting unit having an optical axis along which images of one of two instrumentation displays are transmitted through a beam-splitting layer contained within the unit and along which images of the other instrumentation display are reflected by said beam-splitting layer, said images being respectively produced, on the optical axis and on an axis transverse thereto, by first and second optical systems located respectively in front and to the side of the beam-splitting unit, which comprises a prism unit having at least its front surface on the optical axis formed as a lens surface concave to the front, optical means being provided to receive the images from the beam-splitting unit and to produce a display thereof.

8 Claims, 8 Drawing Figures

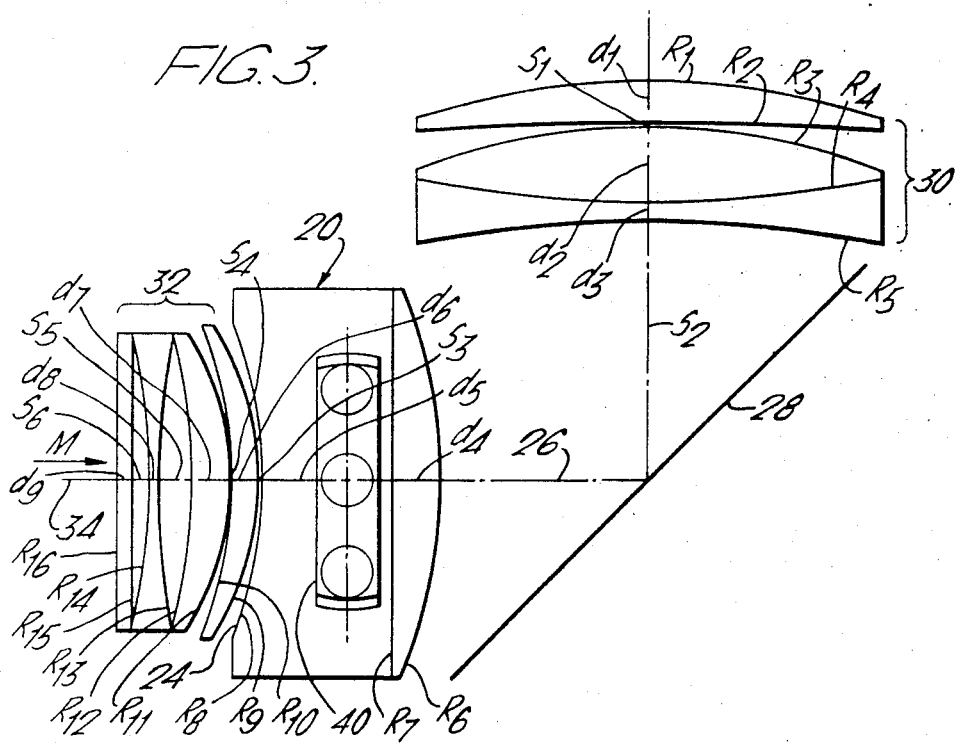
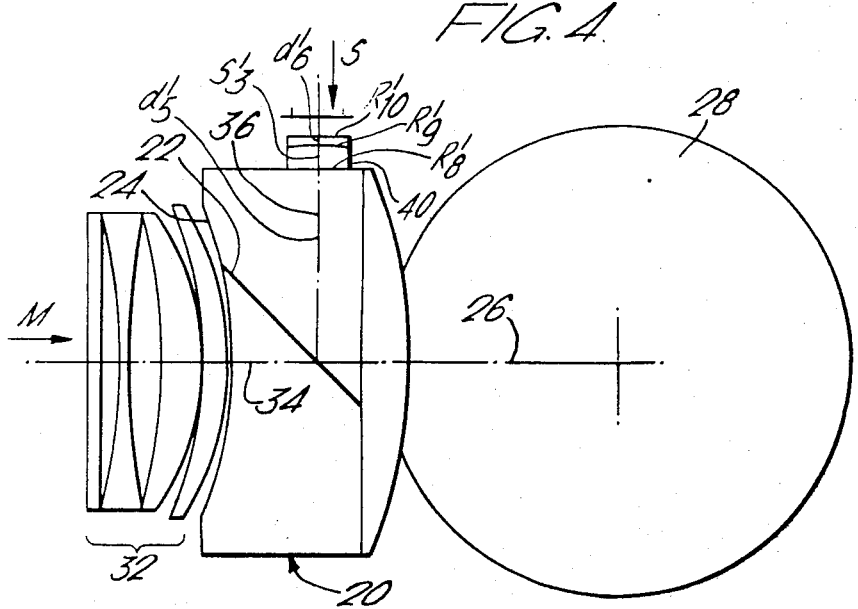

OPTICAL DISPLAY APPARATUS

This invention relates to a head-up display optical unit intended primarily for aircraft, but which can also be used in other vehicles, such as motor vehicles. head-up optical display unit is a unit for transmitting images of instrument readings into the pilot's normal line of vision without requiring the pilot to turn his head from this line to look directly at the instruments.

It has been shown to be desirable to provide, at least in aircraft, main instrumentation which displays readings, and standby instrumentation which displays the same readings, so that, should the main instrumentation fail the standby instrumentation can be referred to.

This invention has for an object to provide a head-up optical display unit which can transmit to the pilot's line of vision images of the main instrumentation and-/or images of the standby instrumentation.

According to the present invention there is provided a head-up optical display unit comprising a beam-splitting prism unit, said unit having at least its front surface formed as a lens surface defining a main optical axis, and a beam-splitting layer intersecting said main optical axis within the unit; a first optical system in front of said prism unit, for producing images on the main optical axis of one of two instrumentation displays, which images are transmitted by the beam-splitting layer along the optical axiis; a second optical system to the side of said prism unit, for producing images on an axis transverse to the main optical axis of the other instrumentation display, which images are reflected by the beam-splitting layer along the optical axis; and optical output means for receiving the images from the beam-splitting unit to produce a display thereof; wherein the said front surface of the beam-splitting prism unit is concave to the front.

Because in practice there is a larger glass path on the transverse axis than on the main optical axis it is important to avoid conflict in spherical aberration between the two paths; the use of the said concave lens surface at the front of the beam-splitting unit assists considerably in this connection and on the main optical axis gives convergence without appreciable under correction of spherical aberration. Further assistance in this respect is gained if the first optical system comprises at least two lens components, one convergent and one divergent, and the second optical system comprises a divergent component.

Figure 2:
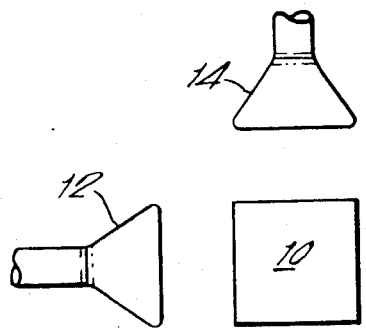
Figure 5:
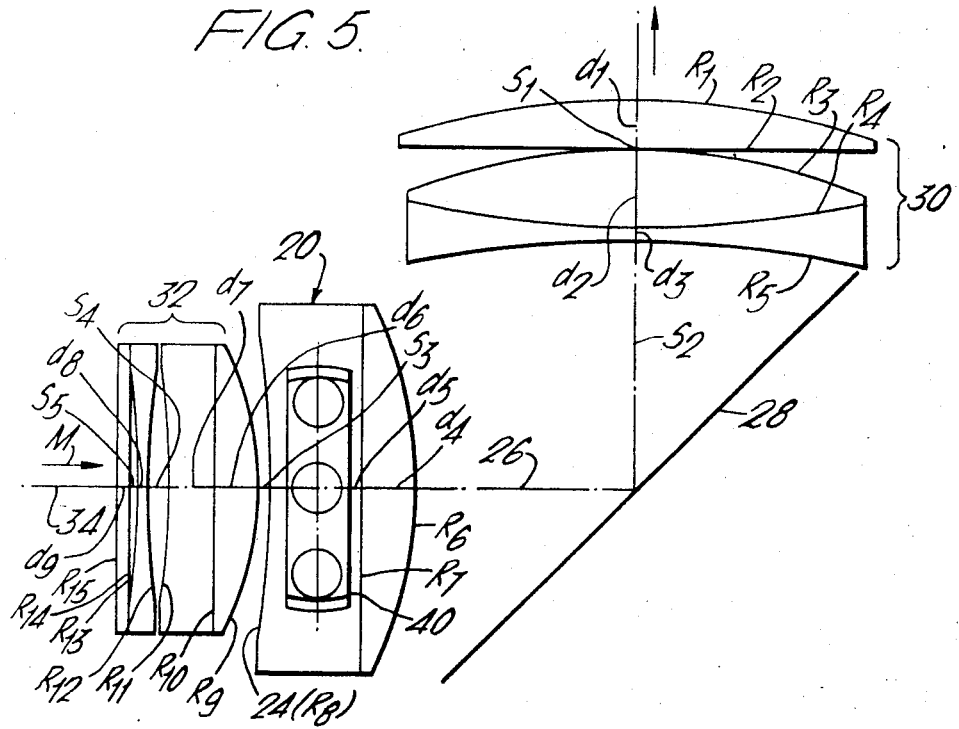

Embodiments of the invention will now be described, by way of example, with reference to the accompanying drawings, wherein FIG. 1 shows diagrammatically and in side elevation the location of a head-up display unit in an aircraft and in relation to the pilot;

FIG. 2 shows in plan view how the head-up optical display unit is located in relation to a main cathode ray tube (CRT) forming main instrumentation and a standby illuminated graticule or auxiliary cathode ray tube (CRT) forming standby instrumentation so that images of these two displays can be transmitted to the pilot's normal line of vision; and FIGS. 3 and 4, FIG. 5 and FIGS. 6 and 7 and 8 respectively show, in elevation and plan, a head-up optical display unit according to three embodiments of the invention.

Referring firstly to FIGS. 1 and 2, the head-up display optical unit 10 is located in front of the pilot P and under his normal line of vision out of the windscreen W. As shown in FIG. 2, the main instrumentation includes a main cathode ray display tube 12 and the standby system includes a standby illuminated graticule or auxiliary cathode ray display tube 14. Images of these displays are transmitted by the optical unit 10 on to a semi-reflecting display plate located immediately in front of the windscreen W. Thus, the images of the displays are transferred to the pilot's normal line of vision and he is at the same time able to see outside the plane through the semi-reflector and windscreen W.

In each of the three illustrated embodiments, the head-up display unit comprises a beam-splitting unit 20, with an internal beam splitting layer 22 and a front surface 24 formed as a lens surface concave to the front and defining a main optical axis. The main instrumentation display is presented at the location indicated by arrow M on the main optical axis and the standby display is presented at the location indicated by arrow S on a transverse axis. Images of both the main and standby displays emerge from the beam-splitter along axis 26, are reflected by reflecting surface 28, and eventually pass through optical output components 30 to the semi-reflecting plate.

The main optical path to the beam splitter 22 passes through main path optical system 32 and is indicated by numeral 34, whilst the standby optical path to the beam splitter through standby optical system 40 is indicated by numeral 36.

The main instrumentation is preferably connected so that the CRT display is in substantial monochromatic green of $\lambda = 0.546\ u$, whilst the standby instrumentation is preferably corrected for substantially monochromatic red light of $\lambda = 0.656\ u$. In such case, the beam splitter 22 is dichroic, to reflect the red light and transmit the green light.

The display unit usually lies with the main optical path 34 and axis 28 horizontal and the output axis vertical, although the fold angle of 90° of reflector 28 as shown in the examples can be varied to a considerable extent without excessive cut-offs.

The graticule or auxiliary CRT in the standby optical path can either be fixed, covering the full extent of the field of vision, or it can be smaller than the field but movable over the field.

The standby and main systems are highly corrected for aberrations both of the types leading to parallax errors, and of the distortion type, and by way of detailed information we give tables or relevant data for the three examples illustrated (Example I, FIGS. 3 and 4; Example II, FIGS. 5 and 6; Example III, FIGS. 7 and 8) in the accompanying drawings.

The data are given for unit focal length of the main system, the corresponding focal length of the standby system also being quoted.

For convenience, in the tables, the individual surfaces $R_1$, $R_2$, etc. are numbered from the rear to the front, i.e., from the image side to the object side, contrary to the usual practice. This is because the lens components which are common to the main system and the standby system are disposed towards the image side. However, it is to be noted that, to correspond with this reversal of conventional practice, the plus and minus signs in front of the radii values respectively indicate that the surface is convex to the rear and convex to the front, which is also contrary to the usual convention. The tables also indicate, for both the main and standby systems, the thicknesses ($d_1$, $d_2$ etc.) of individual lens elements, the separations ($S_1$, $S_2$, etc.) between lens components, and the refractive indices ($N_d$) and the Abbe V numbers (V) of the materials of which the lens elements are made.

Example I

| Radius | Thickness of air separation | $N_d$ | V |
|---|---|---|---|
| Main System | | | |
| R1 = +1.2554 | $d_1$ = .0729 | 1.62041 | 60.33 |
| R2 = +5.8803 | $S_1$ = .0015 | | |
| R3 = +1.0072 | $d_2$ = .1276 | 1.65844 | 50.88 |
| R4 = −1.7496 | $d_3$ = .0233 | 1.76182 | 26.53 |
| R5 = +2.2167 | $S_2$ = .7764 | | |
| R6 = +0.8153 | $d_4$ = .0802 | 1.74400 | 44.77 |
| R7 = ∞ | $d_5$ = .2165 | 1.62096 | 35.90 |
| R8 = +0.7244 | $S_3$ = .0036 | | |
| R9 = +0.4985 | $d_6$ = .0461 | 1.63854 | 55.53 |
| R10 = +0.7162 | $S_4$ = .0015 | | |
| R = +0.4617 | $d_7$ = .0581 | 1.63854 | 55.53 |
| R12 = +0.8868 | $S_5$ = .0503 | | |
| R13 = −1.4884 | $d_8$ = .0146 | 1.91761 | 21.51 |
| R14 = +1.0530 | $S_6$ = .0254 | | |
| R15 = ∞ | $d_9$ = .0263 | 1.62258 | 36.05 |
| R16 = ∞ | | | |
| STANDBY SYSTEM EQUIVALENT FOCAL LENGTH 1.06671 | | | |
| R1 = +1.2554 | $d_1$ = .0729 | 1.62041 | 60.33 |
| R2 = +5.8803 | $S_1$ = .0015 | | |
| R3 = +1.0072 | $d_2$ = .1276 | 1.65844 | 50.88 |
| R4 = −1.7496 | $d_3$ = .0233 | 1.76182 | 26.53 |
| R5 = +2.2167 | $S_2$ = .7764 | | |
| R6 = +0.8153 | $d_4$ = .0802 | 1.74400 | 44.77 |
| R7 = ∞ | $d_5$ = .3938 | 1.62096 | 35.90 |
| R8$^1$ = ∞ | $S_3{}^1$ = .0365 | | |
| R9$^1$ = −0.6077 | $d_6{}^1$ = .0146 | 1.91761 | 21.51 |
| R10$^1$ = +2.6758 | | | |

Example II

| Radius | Thickness or air separation | $N_d$ | V |
|---|---|---|---|
| MAIN SYSTEM | | | |
| R1 = +1.4566 | $d_1$ = .0803 | 1.62041 | 60.33 |
| R2 = +9.4819 | $S_1$ = .0016 | | |
| R3 = +1.0878 | $d_2$ = .1388 | 1.66672 | 48.22 |
| R4 = −1.8215 | $d_3$ = .0257 | 1.76182 | 26.53 |
| R5 = +2.3101 | $S_2$ = .8513 | | |
| R6 = +0.7564 | $d_4$ = .0964 | 1.74400 | 44.77 |
| R7 = ∞ | $d_5$ = .1683 | 1.62096 | 35.90 |
| R8 = +1.8175 | $S_3$ = .0240 | | |
| R9 = +0.5742 | $d_6$ = .0754 | 1.64050 | 60.10 |
| R10 = +19.0945 | $d_7$ = .0800 | 1.91761 | 21.51 |
| R11 = +1.1796 | $S_4$ = .0411 | | |
| R12 = −1.5075 | $d_8$ = .0161 | 1.91761 | 21.51 |
| R13 = +1.4639 | $S_5$ = .1481 | | |
| R14 = ∞ | $d_9$ = .0241 | 1.62258 | 36.05 |
| R15 = ∞ | | | |
| STANDBY SYSTEM EQUIVALENT FOCAL LENGTH 1.08249 | | | |
| R1 = +1.4566 | $d_1$ = .0803 | 1.62041 | 60.33 |
| R2 = +9.4819 | $S_1$ = .0016 | | |
| R3 = +1.0878 | $d_2$ = .1388 | 1.66672 | 48.22 |
| R4 = 1.8215 | $d_3$ = .0257 | 1.76182 | 26.53 |
| R5 = +2.3101 | $S_2$ = .8513 | | |
| R6 = +0.7564 | $d_4$ = .0964 | 1.74400 | 44.77 |
| R7 = ∞ | $d_5{}^1$ = .0416 | 1.62096 | 35.90 |
| R8$^1$ = ∞ | $S_3{}^1$ = .0361 | | |
| R9$^1$ = −0.6425 | $d_6{}^1$ = .0161 | 1.91761 | 21.51 |
| R10$^1$ = +1.7140 | | | |

Example III

| Radius | Thickness or air Separation | $N_d$ | V |
|---|---|---|---|
| MAIN SYSTEM | | | |
| R1 = +1.1513 | $d_1$ = .1851 | 1.65844 | 50.88 |
| R2 = 1.0600 | $d_2$ = .0257 | 1.76182 | 26.53 |
| R3 = +37.8313 | $S_1$ = .0847 | | |
| R4 = +1.0046 | $d_3$ = .1127 | 1.74400 | 44.77 |
| R5 = ∞ | $d_4$ = .2414 | 1.61293 | 37.04 |
| R6 = +3.0294 | $S_2$ = .0016 | | |

Example III-Continued

| Radius | Thickness or air Separation | $N_d$ | V |
|---|---|---|---|
| MAIN SYSTEM | | | |
| R7 = +0.6861 | $d_5$ = .1046 | 1.51680 | 64.17 |
| R8 = ∞ | $d_6$ = .3133 | 1.91761 | 21.51 |
| R9 = ∞ | $S_3$ = .0644 | | |
| R10 = −0.8006 | $d_7$ = .0161 | 1.91761 | 21.51 |
| R11 = +1.6898 | $S_4$ = 0.177 | | |
| R12 = ∞ | $d_8$ = .0262 | 1.62258 | 36.05 |
| R13 = ∞ | | | |
| STANDBY SYSTEM EQUIVALENT FOCAL LENGTH 1.43369 | | | |
| R1 = +1.1513 | $d_1$ = .1851 | 1.65844 | 50.88 |
| R2 = −1.0600 | $d_2$ = .0257 | 1.76182 | 26.53 |
| R3 = +37.8313 | $S_1$ = .7215 | | |
| R4 = +1.0046 | $d_3$ = .1127 | 1.74400 | 44.77 |
| R5 = ∞ | $d_4{}^1$ = .5150 | 1.61293 | 37.04 |
| R6 = ∞ | $d_5{}^1$ = .1127 | 1.91761 | 21.51 |
| R7 = ∞ | $S_2{}^1$ = .0469 | | |
| R8 = −0.6465 | $d_6{}^1$ = .1923 | 1.91761 | 21.51 |
| R9 = ∞ | | | |

Figure 6:
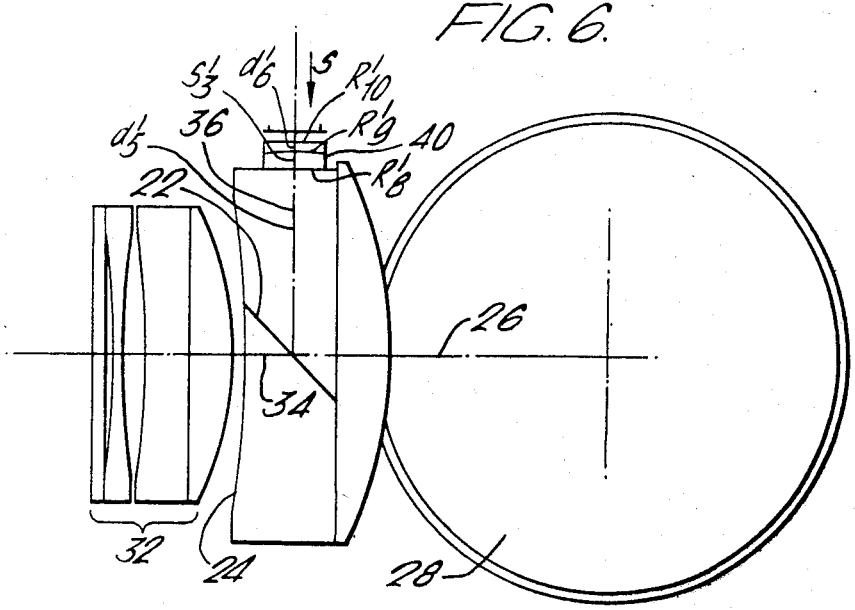
Figure 7:
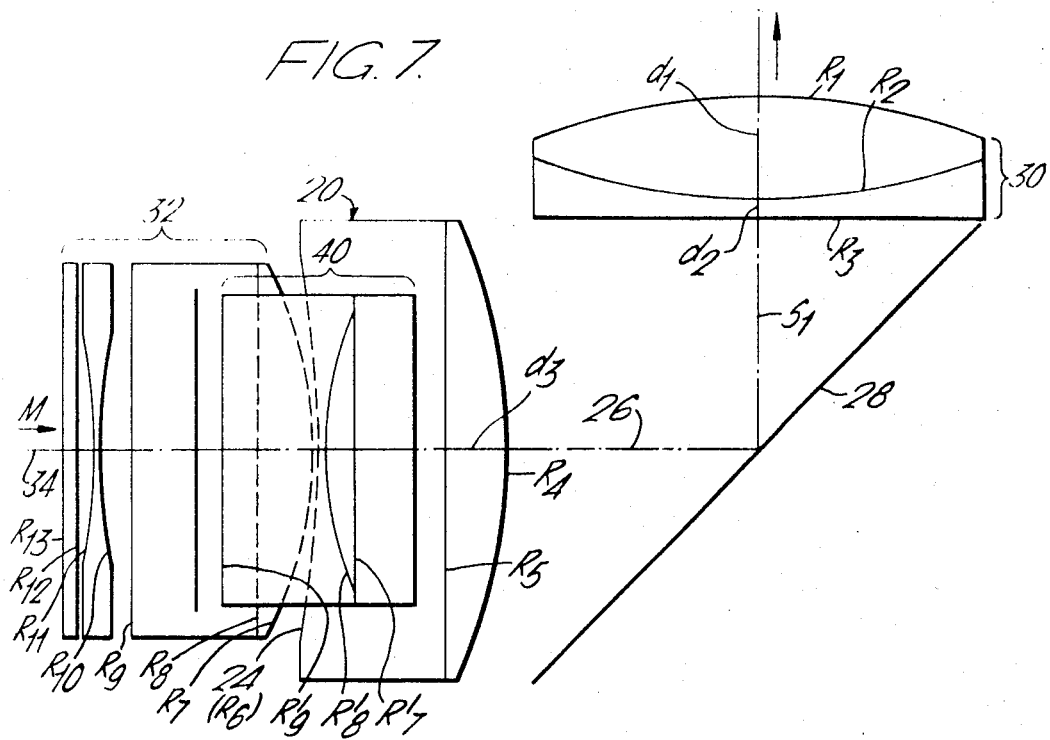
Figure 8:
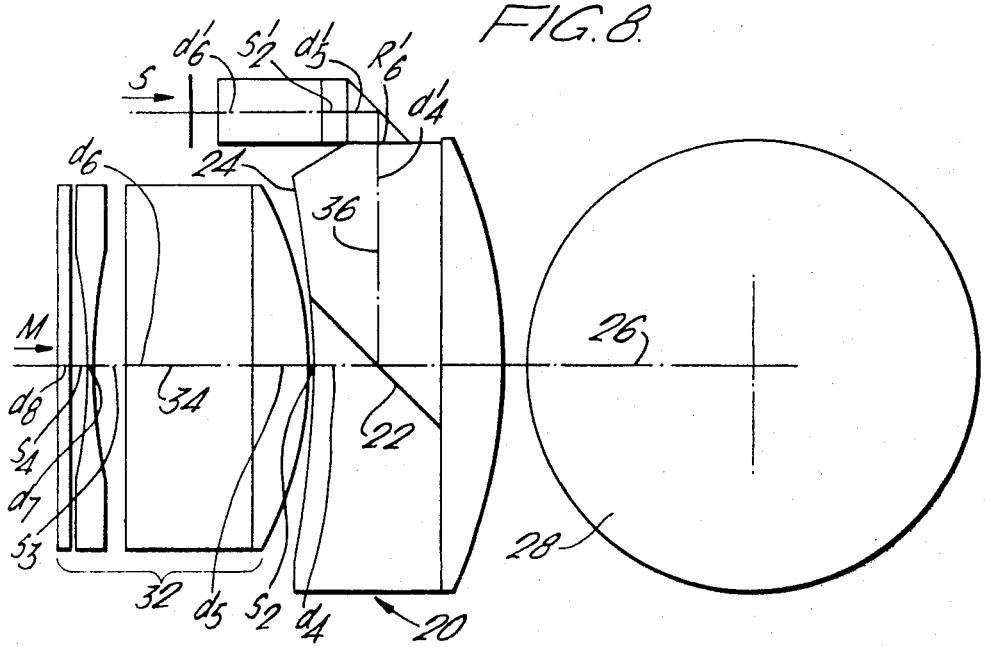

In each of the examples, it will be noted that the beam-splitting unit 20 is a compound prism also having its rear surface ($R_6$ in FIGS. 3 and 5, $R_4$ in FIG. 7) convex to the rear, and that the standby instrumentation image enters the unit through a plane lateral prism surface ($R_8{}^1$ in FIGS. 4 and 6, $R_6{}^1$ in FIG. 8). The optical image system 32 on the main axis in front of the prism unit comprises in each example at least two components, one convergent and one divergent, whilst the optical image forming system 40 on the standby axis comprises a divergent component. In the embodiment of FIGS. 7 and 8, the image of the standby instrumentation is actually formed on an axis parallel to the main axis, and the second image forming system includes a prism reflector for turning the image forming beam through 90° on to the transverse axis along which the beam enters the beam-splitting unit 20. In the first two embodiments the optical output means 30 comprises two convergent components, one compound and one simple, while in the third embodiment the last-mentioned component is dispensed with.

I claim:

1. A head-up optical display unit comprising
a beam-splitting prism unit, said unit having at least its front surface formed as a lens surface defining a main optical axis, and a beam-splitting layer intersecting said main optical axis within the unit;
a first optical system in front of said prism unit, for producing complete images on the main optical axis of one of two instrumentation displays, which complete images are transmitted by the beam-splitting layer along the main optical axis of the beam-splitting unit:
a second optical system to the side of said prism unit, for producing images on an axis transverse to the main optical axis of the other instrumentation display, which images are reflected by the beam-splitting layer along the main optical axis of the beam-splitting unit; and
optical output means for receiving the images from the beam-splitting unit to produce a display thereof;
wherein the glass path along which the images from said first optical system are transmitted differs in length from the glass path along which images from said second optical system are transmitted, and the front surface of said beam-splitting prism unit is concave to the front, with a curvature such that it minimizes the conflict in spherical aberration between the images transmitted along the two paths.

2. A unit according to claim 1, wherein the beam-splitting unit is a compound component also having its rear surface concave to the front.

3. A unit according to claim 1, for handling images of two instrumentation displays of differing colour, wherein the beam-splitting layer is a dichroic layer.

4. A unit according to claim 1, wherein the surface of the beam-splitting unit receiving light on the transverse axis is a plane surface.

5. A unit according to claim 1, wherein the first optical system comprises at least two lens components, one convergent and one divergent, and the second optical system comprises a divergent component.

6. A unit according to claim 1, wherein the first optical system is located on the main optical axis and the second optical system is located on the transverse axis.

7. A unit according to claim 1, wherein the second optical system is located on an axis parallel to the main optical axis and a reflector is provided for turning the images formed thereby on to the transverse axis.

8. A unit according to claim 1, wherein the optical output means comprises at least one convergent lens component for producing a focussed display on a semi-reflecting plate.

* * * * *